CONTINUOUSLY ADJUSTABLE IGNITION TYPE TIME DELAY SWITCH

Filed July 31, 1961

INVENTOR.
IRVING KABIK
BY W. O. Quesenberry
C. A. Hodges ATTYS.
R. B. Sherer AGENT.

United States Patent Office 3,118,994
Patented Jan. 21, 1964

3,118,994

CONTINUOUSLY ADJUSTABLE IGNITION TYPE TIME DELAY SWITCH

Irving Kabik, Silver Spring, Md., assignor to the United States of America as represented by the Secretary of the Navy Filed July 31, 1961, Ser. No. 128,268
10 Claims. (Cl. 200—142)
(Granted under Title 35, U.S. Code (1952), sec. 266)

The invention described herein may be manufactured and used by or for the Government of the United States of America for governmental purposes without the payment of any royalties thereon or therefor.

The present invention relates to time delay switches and more particularly to an ignition type time delay switch for use with primers and detonators, the time delay period being capable of being set for any one of an infinite number of time delay periods.

In the field of time delay switches, time delayed primers and time delayed detonators, it has been the general practice to employ time delay trains of combustible material whose rate of burning is known. These devices rely upon the use of a combustible material of a certain cross-section and predetermined length to thereby set the delay period. Although such devices have served the general purpose, they have not proved entirely satisfactory in that a different time delay train is necessary for each time delay period which is desired. Since the time delay periods of various pieces of ordnance vary considerably, the abovedescribed devices have required the manufacture and stock piling of a multiplicity of various time delay devices, resulting in unnecessary expenditures.

Other time delay devices are also known wherein the time delay material is contained within a rotatable member whose speed of rotation determines the interval of time delay. This type of time delay device is unsatisfactory for use with certain pieces of ordnance since this type requires a relatively large number of elements to control and set the rate of rotation of the rotor and is therefore undesirably large and costly to produce.

Those concerned with the development of time delay switches and particularly those concerned with the development of such switches for use in actuating primers and detonators have long recognized the need for a simple, lightweight, and economical time delay device whose period of time delay can be accurately and precisely set within a wide range of possible delay periods. The present invention fulfills this need by utilizing a temperature responsive, electrically insulated sliding contact whose position relative to the length of the delay train determines the time period of delay.

Accordingly, an object of the present invention is to provide a new and improved time delay switch which may be set for any one of an infinite number of time delay periods.

Another object of the invention is to provide an ignition type time delay switch, the time delay period of which may be selected from an infinite number of possible time delay periods.

Still another object is to provide an economical, lightweight, and low energy type of time delay switch.

A still further object of the invention is to provide a time delay ignition switch for use with primers and detonators wherein the time delay period for detonation of the explosive may be selected from an infinite number of possible time delay periods.

Other objects and advantages of the invention will become more fully apparent from the following description and annexed drawings which illustrate two preferred embodiments and wherein.

Figure 1:
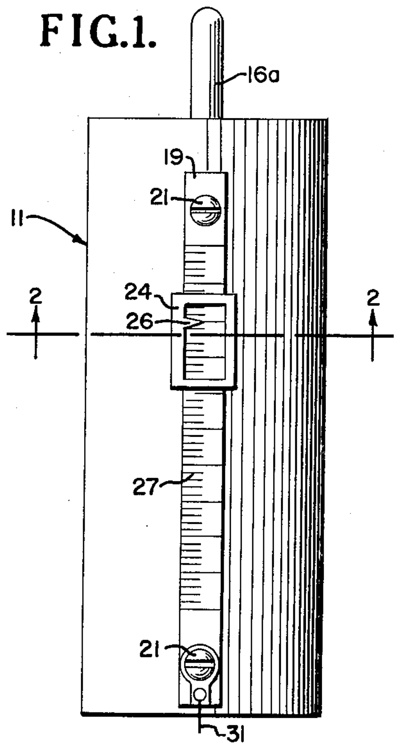
FIG. 1 is an elevational view of a first embodiment of the present invention.
Figure 3:
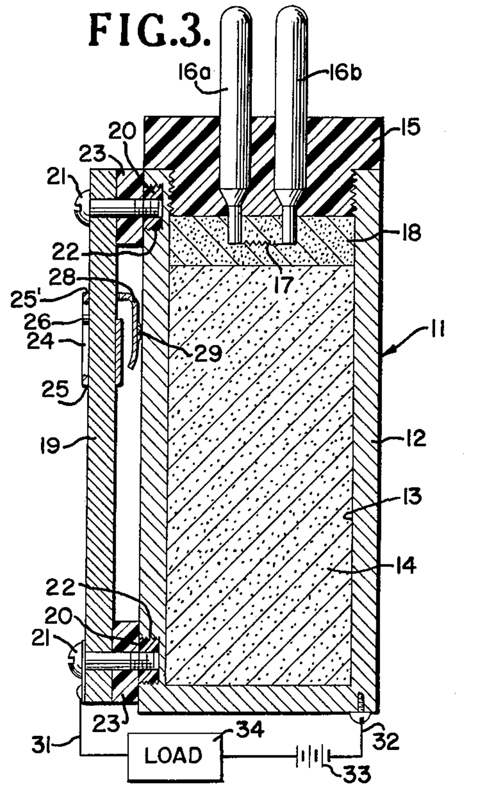
FIG. 3 is a cross-sectional view taken along line 3—3 of FIG. 2.
Figure 2:
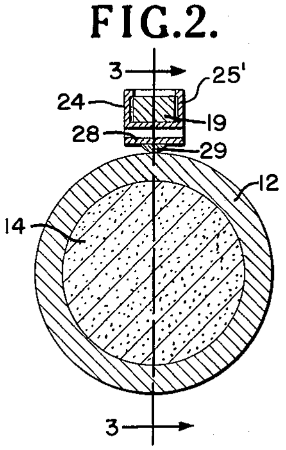
FIG. 2 is a cross-sectional view taken along line 2—2 of FIG. 1.

Referring now to the drawing which illustrates two preferred embodiments of the present invention and wherein like reference numerals designate like parts throughout the several views, numeral 11 designates the delay switch in its first form as shown in FIGS. 1 through 3 wherein delay switch 11 is illustrated as being comprised of an electrically conductive casing 12 which is cylindrical in form and which has a central bore 13 partially filled with delay train material 14, the rate of burning of which is accurately known. As shown most clearly in FIG. 3, the upper end of cylinder 12 is threaded to receive insulated cap 15 which carries electrodes *16a*, *16b*. One end of each electrode projects outwardly beyond the external surface of cap 15 and the other ends are electrically connected by detonator wire 17 which is embedded in a suitable ignition material 18 such as lead styphnate, for example, in contact with delay train material 14.

In operation, electrodes *16a*, *16b* are inserted into suitable female electrical contacts (not shown) and, when a potential difference is thereby applied across electrodes *16a*, *16b*, the detonator wire 17 conducts sufficient current to ignite ignition material 18 which in turn ignites delay train material 14 which then burns downwardly as viewed in FIG. 3 at a known rate.

As shown in each of FIGS. 1 through 3, a slide bar 19 is secured to casing 12 by means of machine screws 21 which are insulated from tapped bores 22 in which they are received by insulating material 20. As further shown in FIG. 3, insulating washers 23 separate slide bar 19 from electrical contact with casing 12 and, as shown in FIG. 1, slide bar 19 is provided with a graduated scale 27 which may be marked, for example, in minutes or multiples thereof. As most clearly shown in FIG. 3, slide bar 19 is frictionally engaged by spring contact 24 having apertures 25, 25' surrounding and engaging slide bar 19. As shown in FIG. 1, spring contact 24 has an indicator point 26 whereby the position of spring contact 24 may be set with respect to graduated scale 27. Referring now to FIG. 3, it should be noted that spring contact 24 includes spring arm 28 which is insulated from electrical contact with casing 12 by means of insulator material 29, the melting point of which is accurately known. A polyvinyl acetal resin such as that known as "Polyvar" has been found to be suitable for use, however, it is to be understood that any insulating material whose melting point is accurately known and which is at or below the combustion temperature of material 14 may be used in place thereof.

In operation, the position of spring contact 24 is preset to the desired delay period and delay train material 14 is ignited in the manner hereinbefore described. Delay mtaerial 14 proceeds to burn with the ignition front moving downwardly in FIG. 3 at a known rate. The heat produced at the burning or ignition front is insufficient to melt insulator material 29 until the burning front is immediately opposite the position of insulator material 29, whereupon, insulator material 29 melts and allows spring arm 23 to contact casing 12 thereby completing the electrical circuit comprising leads 31, 32, battery 33, and load 34 as shown in FIG. 3.

Figure 4:
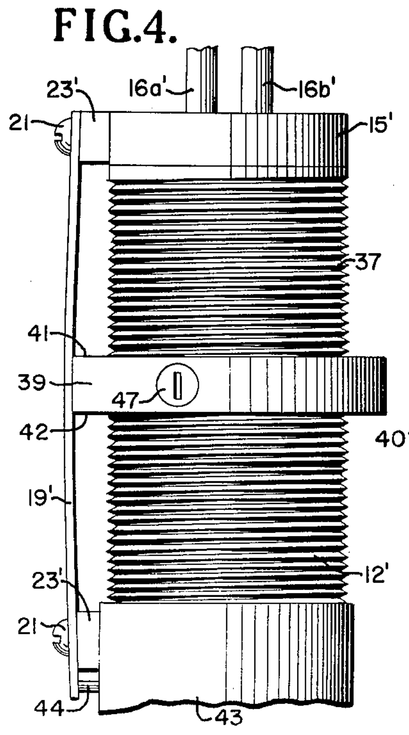
FIG. 4 is a side elevational view showing a second embodiment of the present invention.
Figure 5:
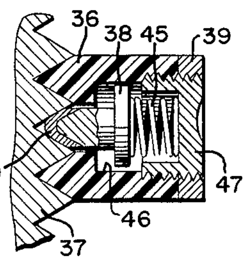
FIG. 5 is an enlarged cross-sectional view of a portion of FIG. 4 showing the contact in greater detail.

Referring now to FIG. 4 wherein a second embodiment of the present invention is shown, it will be seen that time delay switch 11′ is similar to that shown in FIGS. 1 to 3 in that it is comprised of casing 12′, insulator cap 15′, electrodes 16*a*′, 16*b*′, and slide bar 19′ which serve the same functions as their corresponding elements in FIGS. 1 through 3. The FIG. 4 embodiment differs from that illustrated in FIGS. 1–3 in that spring contact 24 has been replaced by an insulating ring 36 threadedly received on threads 37 of casing 12′ and a conductive ring 39 which is secured to ring 36, as for example, by interengaging plug 47.

Insulating ring 36 has a radial bore 46 containing contact 38 which is biased toward engagement with threads 37 by means of electrically conductive spring 45. The radially inner end of contact 38 carries a coating 40 of an insulating material having a known melting point as previously described in the first embodiment of FIGS. 1–3. Electrically conductive spring 45 electrically connects contact 38 with conductive ring 39 which, in turn, engages slide bar 19′ throughout the rotational and linear movement of insulating ring 36. It will be noted that slide bar 19′ is similar to slide bar 19 of FIGS. 1–3 and that the means of securing the slide bar to the casing may be the same as those employed in the first embodiment, however, it has been found advantageous to construct slide bar 19′ of a slightly resilient material and to employ insulating washers 23′ having a thickness slightly less than the combined thickness of insulating ring 36 and conductive ring 39. Conductive ring 39 is therefore maintained in positive electrical contact with slide bar 19′ which is slightly bowed due to the difference in thicknesses as described immediately above. It is to be understood that slide bar 19′ carries a graduated scale (not shown) and that insulating ring 36 may be set in a selected position relative thereto by reference to either of upper edge 41 or lower edge 42.

The second embodiment illustrated in FIG. 4 is found to be advantageous in that the position of contact 38 may be made more precise due to its helical motion, and secondly, insulating ring 36 is less subject to accidental movement subsequent to having been set in the desired position.

FIG. 4 further illustrates the attachment of a detonator 43 directly to casing 12′ by means of threaded engagement with threads 37, however, it is to be understood that the first embodiment illustrated in FIGS. 1–3 may also incorporate the detonator or the load 34 directly on casing 12 so as to present a single unit upon manufacture. This may be easily accomplished in either embodiment by using casing 12 or 12′ as the first electrode to the load device and suitably connecting slide bar 19 or 19′ to an insulated connection such as that shown at 44 in FIG. 4 which serves as the second electrode to the detonator or load device.

From the foregoing description it is apparent that the present invention provides a simple, economic, ignition type delay switch wherein the period of delay may be easily and accurately set for any one of an infinite number of possible delay periods and that this is accomplished without the necessity of constructing separate delay devices, each having a different length or cross sectional area. The present invention therefore avoids unnecessary manufacturing and storage expenses and provides a standardized delay switch which may be used in a wide range of different ordnance devices. It is to be understood, however, that the present invention is by no means limited to the field or use with ordnance but may be incorporated in any environment wherein an infinitely variable time delay switch is desired.

Having thus described the invention, what is claimed and desired to be secured by Letters Patent of the United States is:

1. A time delay switch comprising; an elongated metallic casing, combustible means having a known rate of burning forming a delay train disposed within said casing, means carried by said casing for igniting said combustible means at one end portion thereof, electrical contact means biased toward the casing for selectively establishing an electrical path thereto, meltable heat responsive means normally preventing said contact means from establishing said electrical path until the heat responsive means is melted, said heat responsive means being in contact with the casing and settable to different positions along the casing relative to said delay train whereby, said electrical contact means establishes an electrical path to the casing when said delay train has burned for a preselected period of time and thereby heated the casing sufficiently to melt said heat responsive means.

2. A time delay device comprising; an elongated metallic casing, a fusible delay train having a known rate of burning disposed within said casing along the length thereof, means for igniting said delay train, electrical contact means carried by said casing for establishing an electrical path thereto as the contact means is actuated, meltable heat responsive means carried by said contact means in engagement with an outer surface of said casing for maintaining the contact means electrically insulated therefrom until the heat responsive means is melted, means carried by the casing for varying the position of said heat responsive means relative to said delay train, whereby, upon ignition and continued burning of said fusible delay train for a preselected period of time, said heat responsive means is melted by heat through the casing from said delay train and said contact means establishes an electrical path to the casing.

3. The time delay device as claimed in claim 2 wherein said electrical contact means includes means urging said contact means to closed position and wherein said heat responsive means is positioned between and engages both said contact means and the casing.

4. The time delay device as claimed in claim 3 wherein said contact means include two spaced contact elements, and means for sliding one contact element to different settings relative to the other contact element.

5. The time delay device as claimed in claim 4 wherein said means for igniting said delay train include electrical ignition means disposed within and carried by said casing at an end portion thereof.

6. The time delay device as claimed in claim 4 in combination with a source of electrical energy and a load device series connected to said contact means.

7. The time delay device as claimed in claim 6 wherein said load device is an electro-responsive detonator.

8. A time delay device comprising; an elongated casing composed of an electrically conductive material, a bore located within said casing along the length thereof, combustible material having a known rate of burning positioned in and partially filling said bore, ignition means filling the remaining portion of said bore and forming a closure member for one end thereof, a yieldable contact member initially positioned in closely spaced adjacency to the external surface of said casing, means carried by the casing for urging said contact member from the initial position thereof into electrical engagement with said casing, meltable heat responsive insulating means positioned between and engaged by both said contact member and said casing for preventing electrical engagement thereof until the heat responsive means is melted, means connected to the casing for variably positioning said contact member and said heat responsive insulating means to a predetermined position along said casing whereby, upon ignition and continued burning of said combustible material within said casing for a predetermined period of time and to a point adjacent said contact, said heat responsive insulating means is melted and rendered ineffective to restrain the contact member from electrical engagement with the casing and an electrical connection is established between said casing and said contact member.

9. The time delay device as claimed in claim 8 wherein said heat responsive insulating means is rigidly secured to and movable with said contact member and slideable with respect to the casing.

10. The time delay device as claimed in claim 9 further including an electrically conductive slide bar secured to said casing at respective end portions thereof and insulated therefrom, said slide bar being in electrical engagement with said movable contact member whereby an electrically conductive path is established through said casing, said contact member, and said slide bar upon the melting of said heat responsive insulating means, and means for establishing an external electrical connection to said slide bar.

References Cited in the file of this patent

UNITED STATES PATENTS

| | | |
|---|---|---|
| 729,932 | Hathaway et al. | June 2, 1903 |
| 2,542,889 | Baertl | Feb. 20, 1951 |
| 2,777,034 | King et al. | Jan. 8, 1957 |
| 2,798,921 | Haas | July 9, 1957 |